United States Patent [19]

Cripe

[11] 4,381,713
[45] * May 3, 1983

[54] CONVERTIBLE RAIL-HIGHWAY SEMI-TRAILER AIR CONTROLLED BRAKING AND SUSPENSION SHIFTING SYSTEM

[75] Inventor: Christopher A. Cripe, Coatesville, Pa.

[73] Assignee: Bi-Modal Corporation, Greenwich, Conn.

[*] Notice: The portion of the term of this patent subsequent to Feb. 23, 1999, has been disclaimed.

[21] Appl. No.: 305,443

[22] Filed: Sep. 25, 1981

Related U.S. Application Data

[63] Continuation-in-part of Ser. No. 145,748, May 1, 1980, Pat. No. 4,316,418.

[51] Int. Cl.³ .......................... B60F 1/04; B61D 3/10; B61H 1/00; B62D 61/12
[52] U.S. Cl. ............................... 105/215 C; 105/165; 188/56; 410/45; 410/53
[58] Field of Search .............. 105/215 C, 165; 410/45, 410/53; 188/56

[56] References Cited

U.S. PATENT DOCUMENTS

| | | | |
|---|---|---|---|
| 3,002,469 | 10/1961 | Wanner | 105/215 C |
| 3,342,141 | 9/1967 | Browne | 105/215 C |
| 4,202,277 | 5/1980 | Browne et al. | 105/215 C |
| 4,311,244 | 1/1982 | Hindin et al. | 105/215 C X |
| 4,316,418 | 2/1982 | Hindin et al. | 105/215 C |
| 4,342,264 | 8/1982 | Hindin et al. | 105/215 C X |
| 4,342,265 | 8/1982 | Hindin et al. | 105/215 C |

*Primary Examiner*—Robert B. Reeves
*Assistant Examiner*—Howard Beltran
*Attorney, Agent, or Firm*—Max R. Millman

[57] ABSTRACT

An air control system is provided for a vehicle convertible between highway and railway modes of travel. Air springs suspend a rail-wheel set axle unit and highway wheel-set axle units from the vehicle body so that the one wheel-set axle unit is stored in a raised inoperative position while the other is in the lowered operative position. During a transfer from the highway mode of travel to the railroad mode of travel, or vice-versa, a valved air control system selectively allows the wheel-set axle units to be positioned in either the raised or lowered positions. The air control system also includes, in addition to the mode selection function, the highway braking function, the rail braking function, the parking brake and the emergency brake functions.

9 Claims, 9 Drawing Figures

CONVERTIBLE RAIL-HIGHWAY SEMI-TRAILER AIR CONTROLLED BRAKING AND SUSPENSION SHIFTING SYSTEM

This application is related to U.S. Pat. No. 4,202,277 which is directed to a convertible rail-highway semi-trailer and is a continuation-in-part of application Ser. No. 145,748, filed May 1, 1980, now U.S. Pat. No. 4,316,418.

Said U.S. Pat. No. 4,202,277 covers a body which is supported by air springs on a rail wheel-set axle unit and on a highway wheel-set axle unit adjacent the rear of the body, these units being connected to the body independently of each other, and valve and conduits interconnecting a source of compressed air with the air springs to selectively inflate and deflate the air springs and thereby allow the rail wheel-set axle unit to be stored in an elevated inoperative position when the highway wheel-set axle unit is in a ground-engaging position for the highway mode and vice versa, a mechanism to lift and retain the rail wheel-set axle unit in its elevated stored inoperative position in the highway mode and another mechanism to lift and retain the highway wheel-set axle unit in its elevated stored inoperative positive when in the rail move wherein the flanged rail wheels are in the track-engaging position.

The instant invention relates to the air control system for operating said convertible rail-highway semi-trailer.

It is an object of this invention to provide an improved air control system for controlling the lowering and raising of highway and rail wheel-set axle units in a vehicle convertible between highway and railroad modes of travel.

It is a further object of this invention to provide an air control system in a vehicle convertible between highway and railroad modes of travel in which the sequence of operations during transfer from one mode of travel to the other is controlled so as to minimize the likelihood of damage to mechanical parts resulting from stresses which may build up therein if any are moved at the wrong time.

It is still a further object of this invention to provide an improved air control system which permits multiple functions of air springs including suspension, lowering and raising operations and locking control operations.

It is still a further object of this invention to provide an improved air control system for controlling raising and lowering operations as well as controlling the air functions normally found in highway and railroad systems.

In accordance with the present invention, a vehicle is convertible between highway and railway modes of travel and includes a main body having highway wheel-set axle unit and a rail wheel-set axle unit. An air control system selectively controls the movements of the wheel-set axle units between raised and lowered positions, as well as controlling other conventional functions found in a highway trailer and railway truck. Rail suspension air springs are connected between the body of the vehicle, and rail wheel set axle unit and highway suspension air springs are connected between the body of the vehicle and to the highway wheel-set axle units. A source of air pressure is selectively connected to apply pressure to one or the other of the suspension air springs and exhaust the air pressure from the others. During a transfer from the rail mode to highway mode of travel, the pressure in the rail air suspension springs is exhausted and the body of the vehicle is lowered to actuate a locking mechanism to hold the rail wheel-set axle unit. Subsequently applying pressure to the highway air springs lifts the body of the vehicle thereby raising the rail wheel set axle unit with the body while holding the axle unit in its stored position. When the transfer is from the highway mode to the rail move of travel, the pressure in the highway air springs is exhausted, the locking mechanism released and the air pressure is applied to the rail air spring to raise the body of the vehicle. The highway wheel set axle units are held in their raised stored position by coil springs. Various other functions, such as braking pressures and the like, associated with trailers and rail cars, are compatible with the system and are controlled by the same air control system and utilize the same pressure source.

These and other objects of the invention will become more apparent as the following description proceeds in conjunction with the accompanying drawings, wherein.

Specific reference is now made to the drawings in which similar reference characters are used for corresponding elements throughout.

Figure 1:
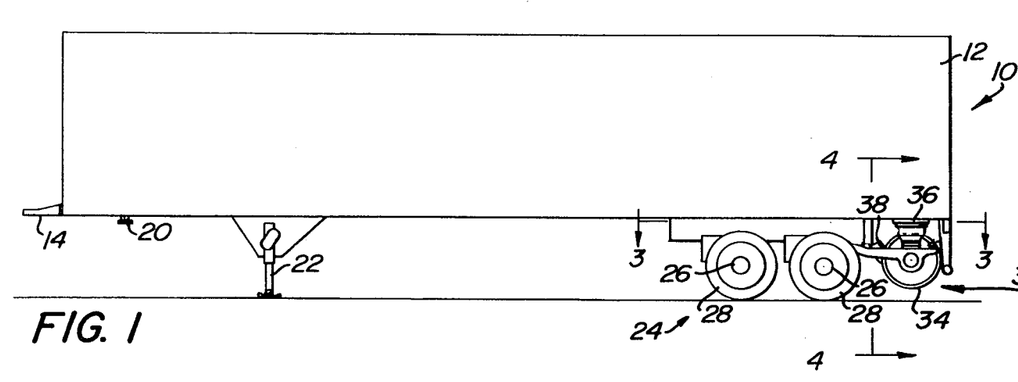
FIG. 1 is a diagrammatic side elevational view of the vehicle shown ready to be coupled to a tractor for the highway mode operation.
Figure 1A:
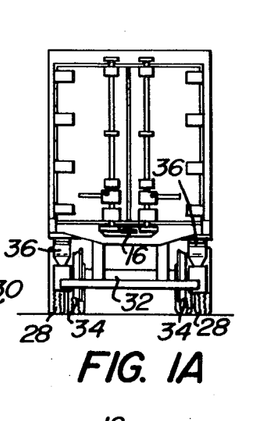
FIG. 1A is a rear elevational view of the vehicle in the highway mode.
Figure 2:
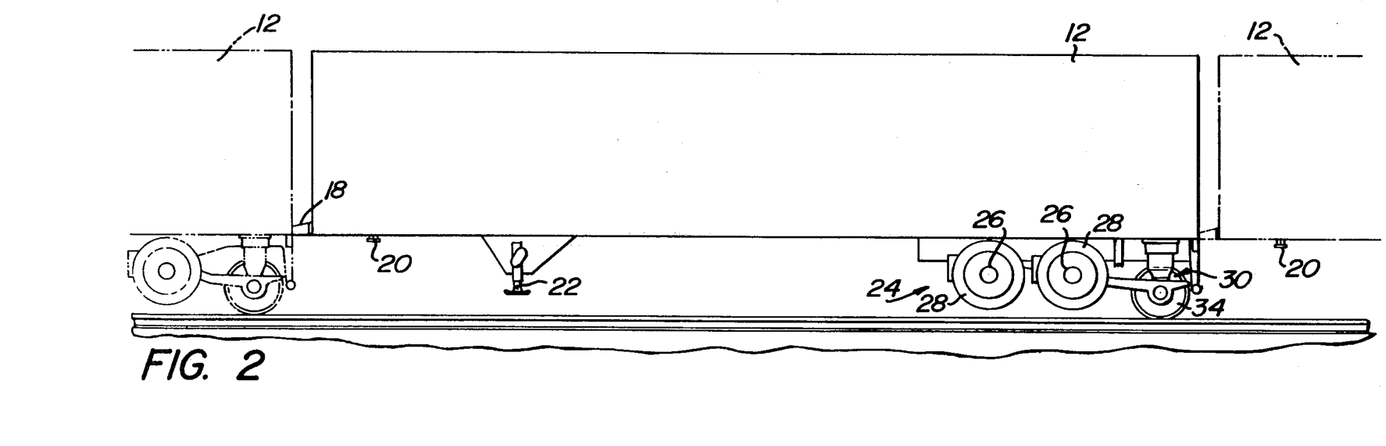
FIG. 2 is a view similar to FIG. 1 of the vehicle in the railway mode operation with the vehicles coupled end to end to form a train.

Referring first to FIGS. 1, 1A and 2, the present vehicle is generally shown at 10 and includes a body 12 of conventional semi-trailer dimensions which could be 45 ft. long, having a male coupling member 14 at its front end, and a female member 16 at its rear end to receive the male coupler of an adjacent body as at 18 to form a train for the railroad mode of operation, as seen in FIG. 2. The vehicle also includes a conventional kingpin 20 adjacent its front end for removable coupling to the fifth wheel of a tractor for the highway mode of operation, conventionally placed, telescoping semi-trailer landing gears 22, highway running gear 24 including tandem axles 26 (although a single axle suspension can be used) each axle mounting dual tired wheels 28, the running gear being suspended from the sub or underframe of the body towards the rear thereof by air springs, the same constituting a highway wheel-set axle unit; and a railroad bogie or rail wheel-set axle unit 30, which includes a single axle 32 mounting a pair of flanged railroad wheels 34, at appropriate rail spacing transversely, the bogie being suspended by air springs 36 from the vehicle body behind the highway running gear 24 and including a braking mechanism 38. The arrangement is such that by appropriate operation of pneumatic apparatus the air springs suspending the highway running gear may be inflated to lower the highway wheels 28 into engagement with a paved road while the air springs 36 of the railroad bogie are deflated so that the rail wheel-set axle unit or bogie may be raised into an elevated inoperative stored position as seen in FIG. 1, and by reversing this operation, the flanged railroad wheels 34 can be lowered to engage the track while the highway wheel-set axle unit is raised into an elevated inoperative stored position as shown in FIG. 2. In this latter railroad mode, the vehicle may be coupled as at 18 end to end to form a train to be pulled by a suitable locomotive. It will be understood that in the highway mode, when the highway wheels 28 engage the road and the flanged railroad wheels 34 are in the raised stored position, the landing gear 22 is in the load supporting position during which time a conventional tractor is coupled to the kingpin 20, the landing gear is telescoped to a raised position and the vehicle will then be driven as an over-the-road tractor-semi-trailer combination.

Figure 3:
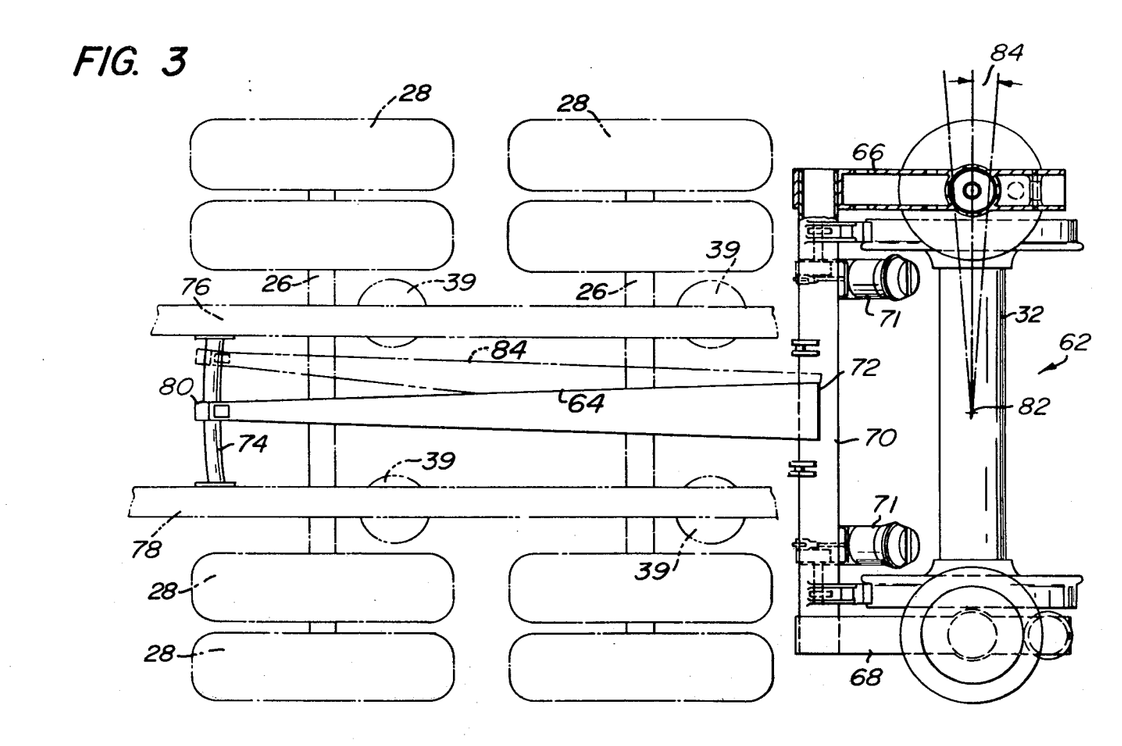
FIG. 3 is a plan view partially in section taken on the line 3—3 of FIG. 1 and showing the rail bogie with the highway axle and wheel assemblies shown in phantom.

In FIG. 3, the air bags 39 on channel members 76 and 78 supporting the body on the highway wheel-set axle unit are shown diagrammatically and are fully described in said U.S. Pat. No. 4,202,277. The bogie 30 which is also shown and described in said U.S. Pat. No. 4,202,277 and is U.S. Pat. No. 4,202,276 and in FIG. 3 comprises a yoke 62 and a longitudinally extending tubular tongue 64 which is angulated so that its forwardly extending portion overlies and clears the highway wheel axles 26. The yoke comprises transversely spaced longitudinal forwardly extending side members 66 and 68, preferably of hollow rectangular configuration which are connected at their forward ends by a transversely extending tubular member 70. The tongue 64 is welded to the transverse tubular member of the yoke as at 72 centrally thereof. The member 70 mounts a suitable brake 71 for each railroad wheel.

At the location of the forward end of the tongue 64, which is about 10 ft. long, an arcuate tube 74 is secured to the running gear channels 76 and 78 of the vehicle extending transversely therebetween. The forward end of the tongue is provided with a split collar 80, retained by bolts. Thus, the bogie is allowed to self steer as the front end of the tongue is allowed to slide from side to side of the arcuate tube 74 so that the rail axle 32 is free to rotate about a vertical axis 82 at its center. The steering angle is limited by the length of the arcuate member 74 and is shown in phantom in FIG. 3 as 84. When the railroad brakes are applied, the arcuate tube 80 supplies the longitudinal restraint, and also the vertical restraint to the forces produced by the brake torque. It will be understood that the arcuate tube 74 may be of any suitable cross-section.

Figure 4:
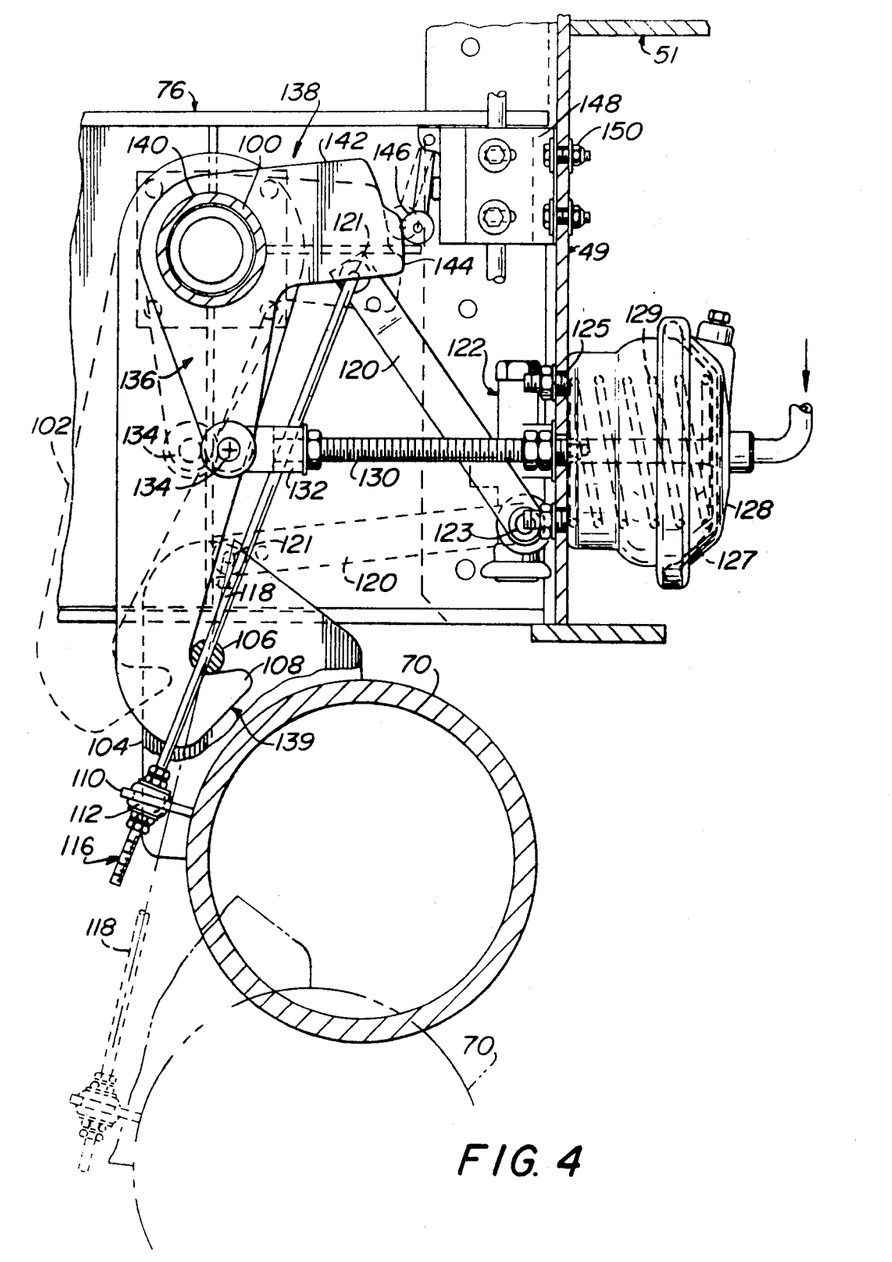
FIG. 4 is a sectional view taken along the line 4—4 of FIG. 1 illustrating the rail bogie lifting and retaining mechanism.

Reference is now made to FIG. 4 where the lifting and retaining mechanism which is the subject of co-pending application Ser. No. 125,507, filed Feb. 28, 1980, now U.S. Pat. No. 4,342,365, issued Aug. 3, 1982 is shown in detail. Rotatably mounted on the longitudinal running gear channels 76 and 78 on the underside of the vehicle body and above the cross tube 70 of the bogie yoke member 62 (FIG. 3) is a transverse tube 100. Welded to the tube 100 and rotatable therewith are a pair of transversely spaced downwardly extending hook members 102 with rearwardly extending hook ends 108. Welded to the cross tube 70 are transversely spaced pairs of lugs 104 which mount transversely extending shoulder bolts 106 between them engageable by the hook end 108 of each hook member 102.

Connected to the tube 70 at a projecting lug 110 by means of grommets 112 and lock nuts and washers is the threaded end 116 of an operating rod 118 whose other end is pivotally connected as at 121 to one end of a lever arm 120 which is pivotally connected to an adjustable position, 3-way, lever-operated height control valve 122 at shaft 123 and selectively opens and closes the valve.

Mounted as at 125 to the vertical web 49 of the rear sill structure of the vehicle underframe is a mechanico-pneumatic brake chamber 128. The chamber includes a diaphragm 127 and a spring 129 which is operatively connected to a threaded piston rod 130 upon which is secured a yoke 132 which mounts a pin 134 which is in turn secured to the arm 136 of a bell crank 138 which is fixed at its corner as at 140 to the rotatable tube 100, the other arm 142 of which also has a cam surface 144 which actuates a roller 146 which is operatively connected to a roller-lever-operated 2-position, 3-way valve 148 and which is also mounted as at 150 on the vertical web member 49. The action of the brake chamber 128 is such that when air is admitted into it behind the diaphragm 127, the spring 128 will be compressed and the push rod 130 will be extended whereas when air is removed from the chamber, the previously compressed spring will expand and retract the rod 130.

In operation, to convert the vehicle from the rail mode to the highway mode, a 3-position, 6-way, lever operated mode selector valve MSV (see FIG. 6) is moved first to a transfer position which actuates 2-position, 2-way pilot-operated quick release valves (see FIG. 6) whereby air is vented from the rail air bags whereupon the vehicle body settles. This shortens the distance between the body and the bogie, i.e., between the tube 100 and cross tube 70, moving the operating rod from the phantom to the solid line position of FIG. 4 thereby opening height sensing valve 122, though in the rail to highway conversion this has no function.

As the body approaches its lowest position, the hooks 102 are in their solid line position, being held there by the spring 129 in brake chamber 127 which is pulling the rod 130 urging the entire assembly consisting of bell crank 138, tube 100, and hooks 102 in a counter-clockwise direction. As the bottom surface 139 of hooks 102 comes into contact with shoulder bolts 106, the hooks are cammed into a clockwise rotation until they can slide into an engaging position under bolts 106, rotating counter-clockwise under the urging of spring 129.

Now, when the highway air bags 39 (FIG. 3) are inflated by moving the mode selector valve MSV to the highway position, the hooks retain the rail wheel-set axle unit in its elevated stored position. In this position the cam 144 acting on the roller 146 keeps valve 148 open and control rod 118 keeps control valve 122 open. These two valves are a safety device to prevent inflation of the rail air bags while the hooks are engaged under the shoulder bolts. As long as valve 148 has its operating lever in the solid line position, it is open (allowing air to flow through), and as long as valve 122 has its operating arm 120 in the solid line position, it is also open. Air to inflate the rail air bags must flow through the "rail" supply line through a 2-position, 2-way, pilot-operated feed valve to adjustable position, 3-way, lever-operated levelling valves and thence to the air bags. However, as long as air pressure is present at the control port of the feed valve, it remains closed, not permitting air to flow to the air bags. Since valves 122 and 148 are both open as long as hooks 102 are engaged, no air can flow to the air bags.

In the reverse conversion from the highway mode to the rail mode, the mode selector valve is moved from "highway" to "transfer," causing deflation of the highway air bags allowing the body to settle until the railroad wheels are on the tracks.

The mode selector valve MSV is now moved to "rail" position directing air through the "rail" supply line to both the feed valve where it is momentarily blocked and to valve 122 from which it is delivered through valve 148 to the control port of the feed valve and at the same time to brake chamber 127 which now pushes hooks 102 out of engagement with shoulder bolts 106 and simultaneously rotates cam surface 144 clockwise allowing valve 148 to close. This now permits air to flow through the feed valve and levelling valves to the air bags, causing the body to rise. Since cross-tube 70 remains down while the body rises, control rod 118 and valve operating arm 120 go to the dotted line position, at which time valve 122 closes off its supply port and vents the chamber 127 to atmosphere allowing spring 129 to return bell crank 138 and hooks 102 to the solid line position, ready for the next cycle. A further description of this and other operations will appear hereinafter in connection with FIGS. 5, 6A, 6B and 6C.

Referring to FIGS. 5, 6A, 6B and 6C, an air circuit schematic for use in a rail-highway semi-trailer system as illustrated in FIGS. 1 and 2 is shown which includes systems for operating the highway braking function, the rail braking function, the operating mode selection function, and the auxiliary functions necessary for operation of such a vehicle.

Figures 5, 6A:
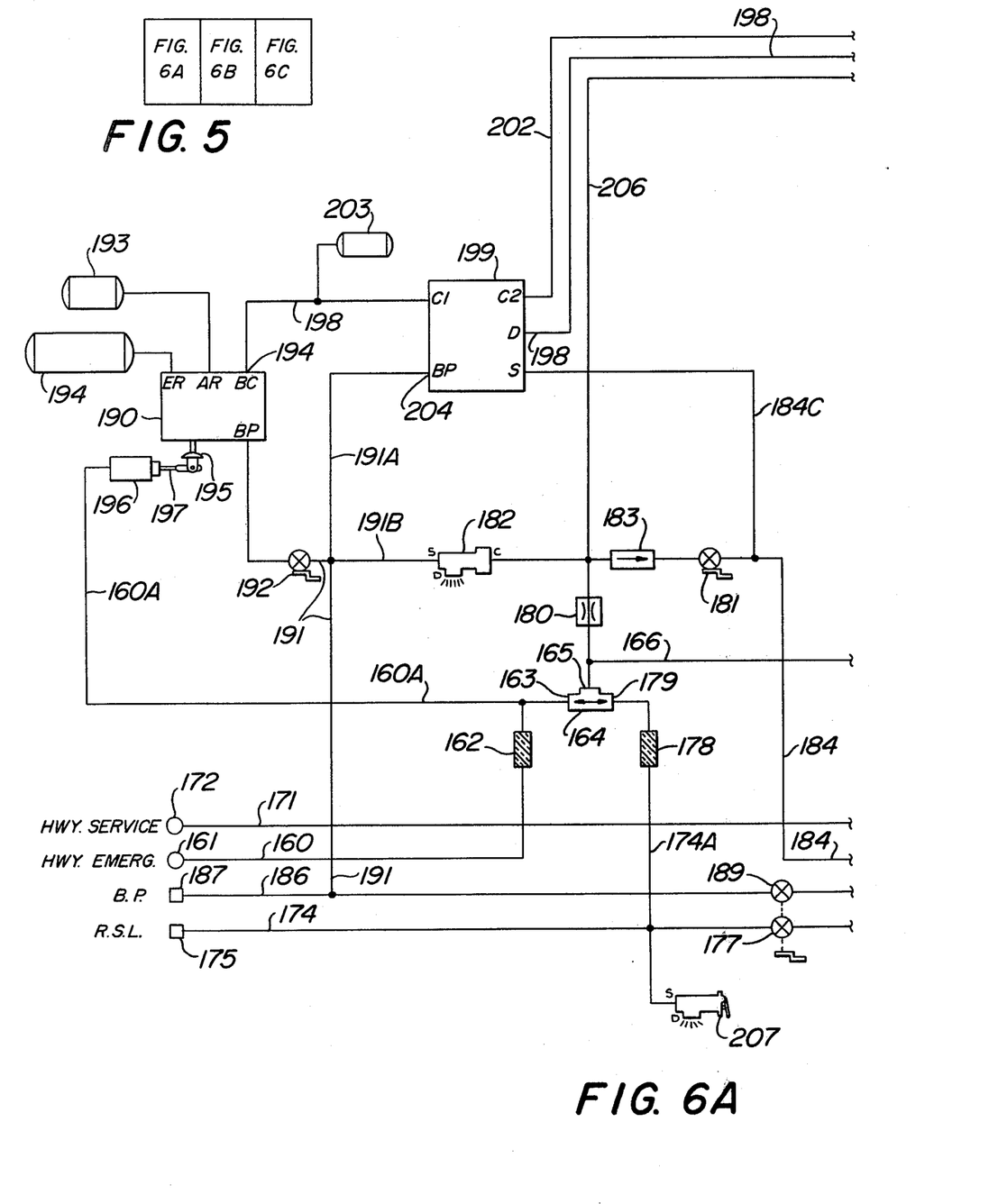
FIG. 5 is a diagram illustrating the arrangement of FIGS. 6A, 6B and 6C in order to provide the composite view.
FIGS. 6A, 6B and 6C are composite diagrammatic views of the pneumatic control system arranged as illustrated in FIG. 5, in accordance with the present invention.
Figure 6B:
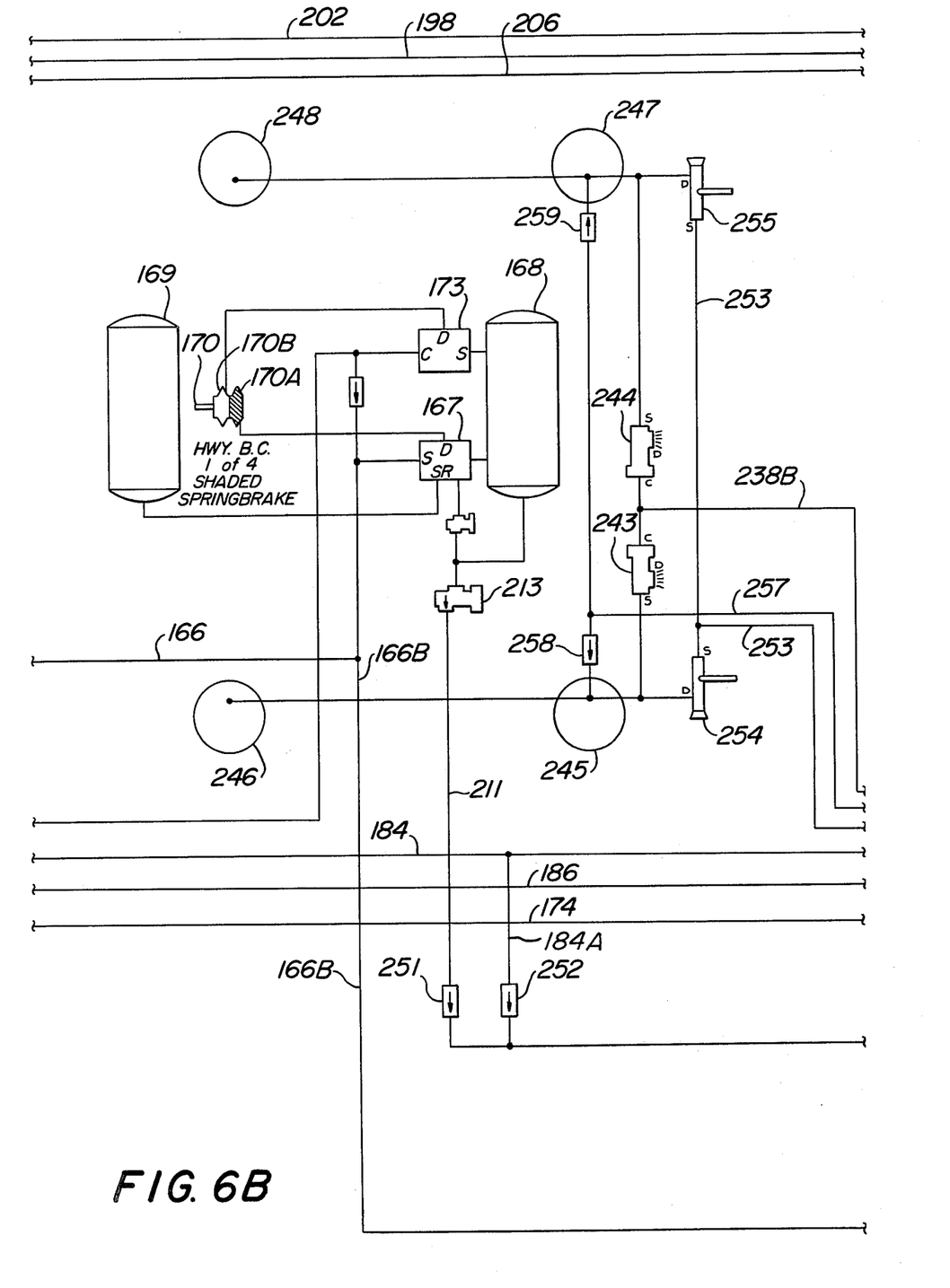
Figure 6C:
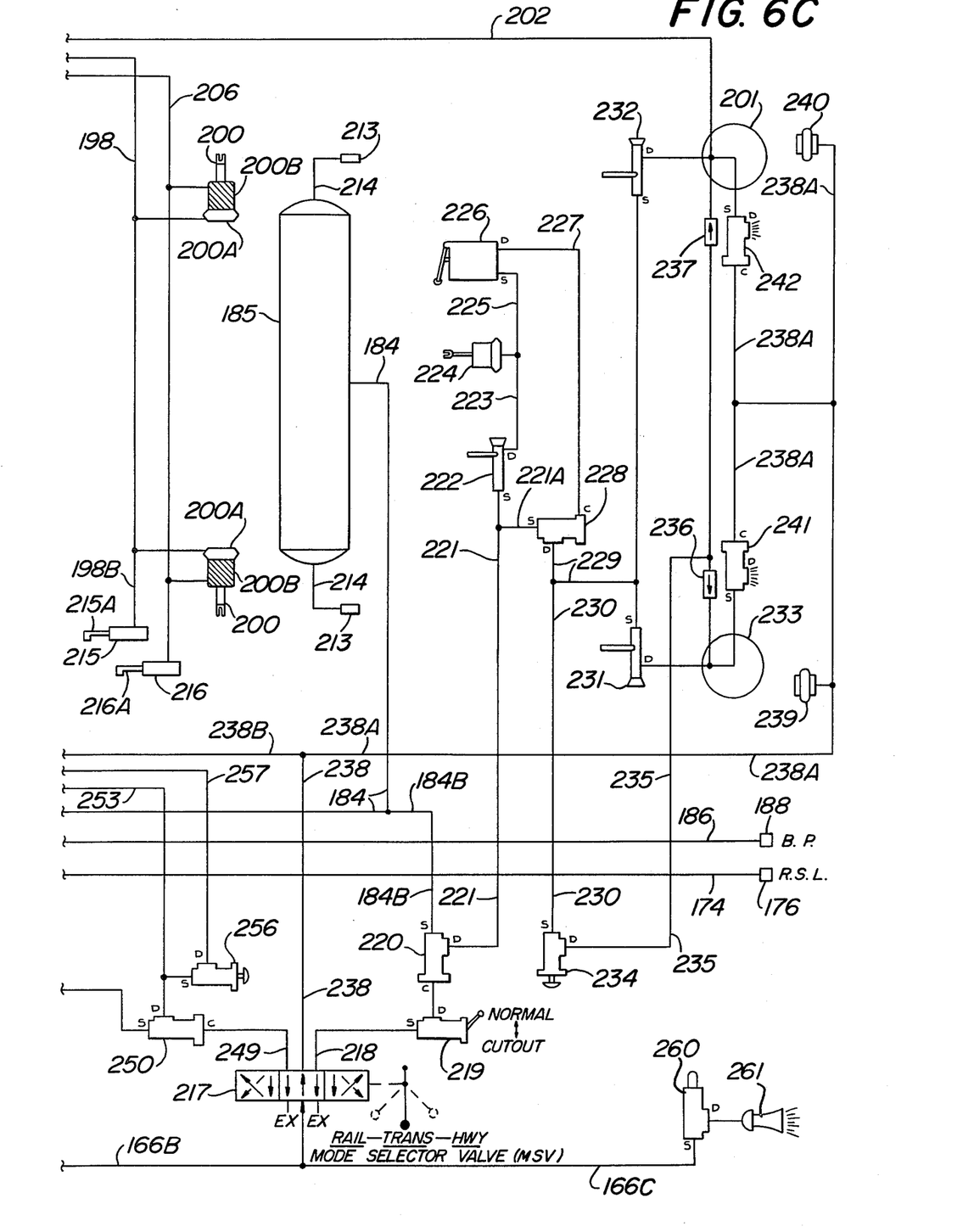

A highway emergency line 160 which, in the highway mode of operation, is kept continually pressurized to approximately 100 psi whenever the vehicle is connected to a truck tractor, is provided with a separable connector or gladhand 161 to connect with the source of pressure. Compressed air from the truck tractor entering line 160 through connector 161 is piped through a filter 162 to one inlet port 163 of a shuttle valve 164. The outlet port 165 of the shuttle valve 164 is piped through line 166 to the supply port of trailer valve 167, through which highway service reservoir 168 and highway emergency reservoir 169 are charged. In addition, trailer valve 167 controls operation of the spring brake portions 170A of highway brake cylinders 170 for emergency and parking functions of the highway brakes should supply pressure be lost from its supply port, as is evident from trailer brake system prior art.

A highway signal or service brake line 171 is connected to the truck tractor by a separable connector or gladhand 172 in the highway mode of operation, and connects to the control port of highway brake relay valve 173. The service brake line 171 is normally open to atmosphere unless the service brakes are applied by the operator of the truck tractor, in which case the brake valve in the truck tractor (not illustrated) closes off the connection to atmosphere and pressurizes the service line 171, thereby operating highway brake relay valve 173 which admits stored air from highway service reservoir 168 to the service portion 170B of highway brake cyliners 170.

For rail operation, a brake pipe 186 is connected to a locomotive by a separable coupling or gladhand 187, and at its opposite end, brake pipe 186 may be connected to a trailing vehicle by a separable coupling or gladhand 188. Also, a rail supply line 174 is connected to a source of compressed air on the locomotive (typically the main reservoir equalizing pipe) by a separable coupling 175, and at its opposite end may be connected to a trailing vehicle by a separable coupling 176.

If there is no trailing vehicle, the rail supply line may be closed off by a shutoff valve 177, which is mechanically slaved to another shutoff valve 189 in the brake pipe 186 so that both operate in unison. Air in the rail supply line is piped to filter 178 by line 174A and from the filter to the second inlet port 179 of shuttle valve 164. The outlet port 165 of the shuttle valve 164 is piped to the highway trailer valve 167 as previously described, and also through restrictor choke 180 to check valve 183, the control port of normally-open pilot-operated valve 182, and through line 206 to the springbrake portions 200B of rail brake cylinders 200 (71 on FIG. 3). Air pressure flows through check valve 183 and rail reservoir cutout valve 181 (which is normally open unless a failure requires the rail reservoir to be cut out) and is piped to the rail reservoir 185 by line 184.

As is evident from the description thus far, air supplied either from a truck tractor through the highway emergency line 160 or from a locomotive through the rail supply line 174 will charge both highway reservoirs 168 and 169 and the rail reservoir 185 due to the action of shuttle valve 164. Air from the rail supply line 174 will keep the highway parking brakes released during rail operation by supplying air to the highway trailer valve 167. Since the highway service brake line 171 is open to atmosphere during rail operation, the highway wheels are therefore free to rotate during rail operation, reducing the risk of damage should the highway wheels encounter obstructions on or adjacent the track.

Springbrake portions 200B of rail brake cylinders 200 serve as spring-applied air-released parking brake actuators for the rail mode of operation. Air from either a locomotive (through rail supply line 174) or from a truck tractor (through highway emergency line 160) will be supplied through choke 180 and line 206 to the rail springbrakes 200B due to the action of shuttle valve 164. This action automatically releases the rail parking brakes whenever an air supply is connected to the vehicle from either source and, conversely, automatically applies the rail parking brakes whenever the air supply is disconnected from the vehicle. It is desirable to release the rail parking brakes when in the highway mode of operation so that the rail wheels may be free to rotate if the vehicle traverses rough terrain.

The brake pipe 186 is also connected to a brake control valve 190 through line 191 and normally open cutout valve 192. The brake control valve 190, commerically designated as the ABD or ABDW type in common railroad use, operates with auxiliary reservoir 193 and emergency reservoir 194 to respond to pressure variations in the brake pipe 186 produced by the engineman's brake valve in the locomotive (not shown) to exhaust or produce a brake cylinder pressure at its brake cylinder port 194. Actual internal operation of brake control valve 190 may be determined by examining railroad brake valve prior art.

Rail brake control valve 190 is equipped with a brake cylinder release handle 195 which, when operated, exhausts any pressure which may be present at the brake cylinder port 194 of the brake control valve 190. A small air cylinder 196 is mechanically connected to the release handle 195 by pushrod 197. The cylinder 196 is piped by line 160A to the highway emergency line 160.

Thus, any time a highway tractor supplies air to the highway emergency line 160, cylinder 196 will operate the rail brake cylinder release handle 195, thereby exhausting pressure at line 198. It will become apparent that this insures the rail wheels will be free to rotate while operating the vehicle in the highway mode, thus minimizing damage to the rail wheels should the tractor driver cut across a high curb while turning, etc.

The brake cylinder port 194 of the rail brake control valve 190 is connected by line 198 to a small reservoir 203 which serves as a dummy brake cylinder volume for the control valve. The control valve 190 thus supplies pressure to or exhausts pressure from reservoir 203 in response to pressure variations in the brake pipe 186 produced by the locomotive engineman. Line 198 is also connected to one control port of a load-ratio/relay valve 199. The load-ratio/relay valve supplies air from the rail reservoir 185 (via lines 184 and 184C) to the service portions 200A of the rail brake cylinders 200 (via line 198A) in response to two control pressures. The main control pressure is received from the rail brake control valve brake cylinder port via line 198, while the second control pressure is received from the rail air spring 201 (36) on FIG. 1 via line 202. The load-ratio/relay valve 199 supplies air to the brake cylinders when the rail brake control valve 190 supplies pressure to the dummy brake cylinder volume 203 (and hence its main control port), but the maximum pressure supplied to the brake cylinders is limited by control pressure at its second control port. This second control pressure is received from the rail air spring 201 (39 on FIG. 3) whose pressure is proportional to the vehicle weight. Thus, for any car weight from empty to fully loaded, the maximum rail brake cylinder pressure is limited accordingly to obtain maximum effective braking without the danger of sliding the rail wheels due to excessive brake cylinder pressure. In addition, brake pipe pressure is connected to compensation port 204 on the load-ratio/relay valve 199 by lines 191 and 191A. Should brake pipe pressure drop to zero, which occurs if emergency braking is selected by the locomotive engineman, loss of pressure at the compensation port allows the load-ratio/relay valve to pass a higher pressure to the rail brake cylinders for emergency stops.

Upon release of a brake application, the rail brake control valve 190 opens its brake cylinder port 194 to atmosphere, thereby exhausting the dummy brake cylinder volume 203 and the main control pressure to the load-ratio/relay valve 199. This, in turn, will cause the load-ratio/relay valve to exhaust the service portions of the rail brake cylinders (via line 198A) through its exhaust port (not shown).

Normally-open pilot-operated valve 182 is incorporated into the system to provide automatic emergency brake applications during rail operation should failures occur on any such vehicle in a train which would result in dangerous operating conditions. Its supply port is piped into the brake pipe 186 via lines 191 and 191B, and its delivery port is open to atmosphere. Should pilot pressure be lost at the valve's control port, brake pipe 186 is opened to exhaust, which will cause rail brake control valve 190 to assume its emergency function and propagate the emergency application to the other vehicles in the train.

Normally-open pilot-operated valve 182 is maintained closed by pilot or control pressure received from a point just after the restrictor choke 180, as may be determined by examining the schematic diagram. If rail reservoir 185 or its feed line 184 should fail, restrictor choke 180 will not allow enough air to pass to maintain pressure against the failure. Similarly, if springbrake 200B failure should occur on either rail brake cylinder 200 of if springbrake feed line 206 should rupture, restrictor choke 180 will not allow enough air to pass to maintain control pressure on valve 182. Upon such a reduction of control pressure, valve 182 will open brake pipe 186 to exhaust via lines 191 and 191B, producing an emergency train brake application. Likewise, should the rail supply line 174 lose pressure due to a failure during rail operation, valve 182 will lose pilot pressure and thereby produce the same result.

Piped directly to the rail reservoir 185 are two hotbox detectors 213 which are affixed to the housings of each rail axle journal bearing. The detectors each consist of a low melting point (typically 350° F.) metal plug closing off the end of each pipe 214 leading directly from the rail reservoir 185. Should either rail journal bearing overheat, the metal plug 213 will melt and blow out, thereby opening the rail reservoir 185 to exhaust. This will cause normally-open pilot-operated valve 182 to open the brake pipe 186 to exhaust as previously described, thereby initiating an emergency train brake application. This provides full-time on-board hotbox protection for each vehicle.

The action of normally-open pilot-operated valve 182 as described above therefore protects the vehicle (by producing an automatic stop) against several potentially dangerous conditions which could occur as a result of failures:

1. Rail reservoir failure, which would disrupt the air supply for the rail air springs, resulting in degraded ride quality.

2. Springbrake or springbrake hose failure which would result in dragging brakes on an individual car which could go undetected in a train. This could result in overheating of the rail wheels and subsequent thermal damage.

3. Rail supply line failure or hose separation between cars which would disrupt the air supply for a number of cars in a train.

4. Rail journal bearing failure which could result in rail axle failure and subsequent derailment.

A manually-operated, normally-closed (momentary) valve 207 is provided on the vehicle, whose supply port is connected into the rail supply line 174. The delivery port of the valve is open to atmosphere. This valve may be operated manually by a trainman to exhaust the air present in rail supply line 174 when it is desired to disconnect the separable air couplings between cars during train disassembly.

Because of the action of pilot-operated valve 182 as previously described, exhausting the air in the rail supply line 174 will cause the air to be exhausted from the brake pipe also, permitting safe separation of both hoses between cars.

A small air cylinder 215 is connected by line 198B to the service portions 200A of rail brake cylinders 200 and is located on the vehicle in such a manner as to be concealed from view when its pushrod is retracted. Affixed to its pushrod is a brightly colored flag or other indicator 215 arranged in such a manner as to become plainly visible on the vehicle should the cylinder pushrod extend when air pressure is present in line 198B. This serves as a simple visible rail service brake indicator when air pressure is present in the rail service brake chambers, assisting in determining the rail brake system status during train inspections.

A small air cylinder 216 is connected by line 206 to the rail springbrake portions 200B of rail brake cylinders 200 and is located on the vehicle in such a manner as to be concealed from view when its pushrod is retracted. Affixed to its pushrod is a brightly colored flag or other indicator 216 arranged in such a manner as to become plainly visible on the vehicle should the clyinder pushrod extend (by an internal spring) when air pressure is absent in line 206 (thus, when the rail parking brakes are applied). This serves as a simple visible rail parking brake indicator, assisting in determining the rail brake system status during train inspection.

Compressed air from either the highway emergency line 160 or the rail supply line 174 (depending on the operating mode) appears at the delivery port 165 of shuttle valve 164 as described earlier and is piped through lines 166 and 166B to mode selector valve MSV 217. The MSV 217 is a manually-operated three-position valve. This permits the system to be switched between the rail mode of operation, the highway mode of operation, and a transfer mode during which a transfer is made from one mode to the other, i.e., from the rail mode to the highway mode or vice versa. The last named position involving transfer is illustrated in the drawing. This is the center position on the MSV 217.

In the rail mode of operation, the right hand side of the MSV 180 is aligned with the connection to pipe or line 218. Supply air enters the MSV from the line 166B and is piped to the supply port of the three-way manually-operated valve 219 by line 218. The three-way manually-operated valve 219 is normally open at all times unless a failure requires that it be closed to isolate the rail auxiliary devices. The delivery port of the three-way valve 219 is piped directly to the control port of the rail mode auxiliaries control pilot-operated valve 220. Air-operated auxiliary devices for the rail mode of operation are supplied by the rail reservoir 185 (via lines 184 and 184B) through the rail mode auxiliaries control valve 220 as long as pilot pressure is applied as its control port by the MSV. Closing the three-way manually-operated valve 219 exhausts control pressure at the auxiliaries control valve 220, thus isolating the auxiliary devices downstream of 220 from the rail reservoir should failure occur requiring this to be done to conserve rail reservoir air.

With the MSV in the "rail" position, rail reservoir air flows from the delivery port of rail auxiliaries control valve 220 through line 221 to a rail bogie position sensing valve 222 (122 on FIG. 4) associated with the cross tube 70 (FIG. 4). The valve 222 should be open after any transfer operation to allow air to flow through line 223 to a lifting hook cylinder 224 (128 on FIG. 4). Air also passes through line 225 to hook position sensing valve 226 (148 on FIG. 4). The valve 226 is open as long as the cross tube 70 lifting hooks 102 are in the engaged position. Air passes from the valve 226 and flows through line 227 to the control port of a rail airbag interlock cut-off valve 228 which remains closed as long as valve 226 is open.

When lifting hook cylinder 224 is pressurized, it disengages cross tube lifting hooks 102 closing the hook position sensing valve 226 which allows air from line 221A to flow through the rail airbag interlock cut-off valve 228 to lines 229 and 230. Lines 229 supply air to the rail levelling valves 231 and 232. When the position of the vehicle body 12 (FIG. 1) is lower than correct operating height, air is admitted to the rail suspension air springs 233 and 201. When the air springs 233 and 201 are properly inflated, the levelling valves 231 and 232 close off the air supply thereto.

Line 230 supplies air to a manually-operated rail quick fill valve 234. Air from the valve 234 may flow through a line 235 to supply air directly to the air springs 233 and 201 through quick fill check valves 236 and 237 respectively, bypassing the levelling valves 231 and 232. The valves 234, 236 and 237 are used to speed up the inflation of the air springs 233 and 201 during initial filling or when it is desirable to raise the body of the vehicle above its normal operating height. Line 202 transmits the air spring pressure to the control port of the rail brake load-ratio control valve 199 as described earlier.

When it is desired to convert from rail travel to highway travel, the vehicle 10 has been uncoupled from a train and is resting on a tractor fifth wheel, with the highway service and emergency lines connected to the tractor air lines but with its rail wheels still on the track and its highway wheels in the raised position. FIG. 2 illustrates the highway wheels 28 in raised position with the rail wheels 34 in lowered position.

The MSV 217 is shifted to the transfer or center position as illustrated. In this position, air flows from line 166B, through the MSV, and into lines 238, 238A and 238B. Air pressure in line 238A inflates bumper pin release cylinders 239 and 240 which retract bumper pins (not shown) allowing the rail suspension strut to telescope, the details of which are shown and described in copending application Ser. No. 125,505 filed Feb. 28, 1980, now U.S. Pat. No. 4,342,264, issued Aug. 3, 1982.

Simultaneously, air from the line 238A flows to the control port of rail air spring quick release valves 241 and 242 which open, exhausting air springs 233 and 201 respectively. This allows the vehicle body to lower until the lifting hooks 102 engage the lifting lugs 104 on the cross tube 70 of the rail bogie 62. At the same time, air pressure in line 238B will open the highway air spring quick release valves 243 and 244 to exhaust the highway air springs 245, 246, 247 and 248. This operation in this case is meaningless since the highway air springs are already empty, the vehicle having been in the rail mode.

To achieve highway operation, the MSV 217 is now shifted to the highway position, which is the left hand position illustrated. In this position, air pressure now is piped from line 166B through MSV 217, through line 249 and pressurizes the control port of highway auxiliaries control pilot-operated valve 250, thereby causing it to open.

Highway auxiliaries control valve 250 is supplied either from the highway reservoir 168 through pressure protection valve 213, line 211, and check valve 251, or from the rail reservoir 185 through lines 184 and 184A and check valve 252. This is done to ensure that large amounts of air needed for the initial inflation of the highway air springs are available even if the highway pressure protection valve 213 should close due to high air use from the highway reservoir 168 during this process. (The highway pressure protection valve 213 is used to protect the highway service reservoir 168 from being depleted should a failure occur causing excessive air consumption at line 211. If such a failure should occur, pressure protection valve 213 closes at a preset pressure, i.e., 80 psi, thus saving the remaining air in reservoir 168 for highway brake system use). Should this occur, the inflation of the highway air springs can continue by utilizing air from the rail reservoir, thus reducing the inflation time required to raise the vehicle body with the highway air springs.

With highway auxiliaries control valve 250 open, air flows through line 253 to highway levelling valves 254 and 255. Air from these valves passes to the highway air springs 245, 246, 247 and 248 to inflate them and raise the body 12 (FIG. 1) to its operating height. The cross tube lifting hooks 102 which are attached to the body 12 raise the rail axle and wheel set of the rail bogie in their stored position.

To speed up the inflation of the highway air springs 245, 246, 247 and 248, a highway quick fill valve 256 may be manually opened, allowing air from line 253 to flow through line 257 and through quick fill check valves 258 and 259 directly to the highway air springs 245, 246, 247 and 248, thereby bypassing the highway levelling valves 254 and 255.

When it is desired to convert back to rail operation, the vehicle is positioned by a tractor with the rail wheels over the rails, its front end still on the tractor fifth wheel and the highway air lines still connected. The mode selector valve 217 is again placed in the transfer position so that lines 238, 238A and 238B are pressurized, applying control pressure to highway air spring quick release valves 243 and 244, thereby opening them and exhausting the air from the highway air springs. At this time, the rail air spring quick exhaust valves 241 and 242 will also open, but this is meaningless as there is no pressure in the rail air springs at this time.

When the vehicle body has settled due to the deflation of the highway air springs, the MSV 217 can be moved to the rail position, initiating the operations again as previously described. The symbols in the drawings D, S and C mean Delivery, Supply and Control, respectively. Exhaust ports are not illustrated.

While it does not enter into the air circuitry illustrated, the highway axle and wheel sets are raised into their stored position and retained there by mechanical springs. The spring forces are overcome by the highway air springs 245, 246, 247 and 248 when inflated. One such mechanical arrangement for storing the highway axle and wheel sets is illustrated in U.S. Pat. No. 4,202,277 to which reference has been made.

Supply air at the delivery port 165 of shuttle valve 164 is routed by lines 166, 166B and 166C to the supply port of a coupler pin sensing valve 260 which senses the position of the coupling pin within member 6. If the coupling pin 14 is in a locked position, engaged with member 16 of a similar vehicle, or in its locked position in the absence of another vehicle to the rear, the valve 260 will be closed. If the coupler pin is not locked, the valve 260 is open, and a "coupler open" alarm horn 261 sounds. This ensures that an audible warning will sound any time the coupler is not in a safe, locked condition. A coupling arrangement of this type is described in copending application, Ser. No. 125,506, filed Feb. 28, 1980 now U.S. Pat. No. 4,311,244.

What is claimed is:

1. In a vehicle convertible from highway to railroad mode of travel and vice versa; including a body, a rail wheel-set axle unit, air spring means supporting said body on said rail wheel-set axle unit, a highway wheel-set axle unit, air spring means supporting said body on said highway wheel-set axle unit, means interconnecting said body and said rail wheel-set axle unit operative to lift and retain said rail wheel-set axle unit in its elevated stored inoperative position in the highway mode, and means interconnecting said body and said highway wheel-set axle unit operative to lift and retain said highway wheel-set axle unit in its elevated stored inoperative position in the rail mode, said vehicle also including conduit means for connecting said vehicle to a source of compressed air external to said body, rail brake and highway brake systems operatively connected to said conduit means, and an air control system operatively connected to said rail and highway air spring means and to said rail and highway brake systems, said air control system comprising:

a. a three way mode selector valve connected to said conduit means for directing the application of pressure from said source of compressed air to said rail wheel-set axle unit air spring means when it is in a first position during a rail mode of travel, for directing the application of pressure from said source of compressed air to said highway wheel-set axle air spring means when it is in a second position during a highway mode of travel, and for preventing the application of pressure from said source of compressed air to both said rail and highway wheel-set axle unit air spring means when it is in a third position during a transfer from one mode of travel to the other, and b. levelling valves to control air from said source of compressed air to said rail and highway wheel-set axle air spring means to maintain them at predetermined heights.

2. The combination of claim 1 in which said rail brake system includes rail brake cylinders, a reservoir for supplying pressure to said rail brake cylinders, a brake pipe, said conduit means including a supply pipe, said supply pipe connecting said source of compressed air to said reservoir, first control valve means connected between said reservoir and said rail brake cylinders, said brake pipe normally containing air under pressure, and a second control valve means operatively interconnecting said rail brake pipe and said first control valve means to selectively apply said rail brakes upon a reduction of pressure in said brake pipe and to release said rail brakes upon an increase of pressure in said brake pipe.

3. The combination of claim 1 in which said highway brake system includes highway brake cylinders, a second reservoir for supplying pressure to said highway brake cylinders, a highway service line, said conduit means including a supply pipe, said supply pipe connecting said source of compressed air to said second reservoir, control valve means connected between said second reservoir and said highway brake cylinders, said highway service line being normally open to atmosphere and operatively connected to said control valve means to selectively apply said highway brakes upon pressurization of said service line and release said highway brakes upon venting of said service line to atmosphere.

4. The combination of claim 1 and means to maintain said rail brakes in a released state while the vehicle is operated in the highway mode.

5. The combination of claim 4 and other means to maintain said highway brakes in a released state while the vehicle is operated in the rail mode.

6. In a vehicle convertible from highway to railroad mode of travel and vice versa including a body; a rail wheel-set axle unit, air spring means supporting said body on said rail wheel-set axle unit, a highway wheel-set axle unit, air spring means supporting said body on said highway wheel-set axle unit, means interconnecting said body and said rail wheel-set axle unit operative to left and retain said rail wheel-set axle unit in its elevated stored inoperative position in the highway mode, and means interconnecting said body and said highway wheel-set axle unit operative to lift and retain said highway wheel-set axle unit in its elevated stored inoperative position in the rail mode, said vehicle including rail brake and highway brake systems, and conduit means for connecting said vehicle to a source of compressed air external to said body, an air control system operatively connected to said rail and highway air spring means and to said rail and highway brake systems, said rail brake system comprising:
   a. rail brake cylinders, each cylinder including a service brake chamber and a spring brake chamber having a spring therein,
   b. a rail brake to function as a parking brake when operated by said spring within said spring brake chamber,
   c. a supply pipe operatively interconnecting said source of compressed air with said spring brake chamber,
  said rail parking brake being released when said supply pipe remains operatively connected to said source of compressed air and said rail parking brake being applied when said supply pipe is vented to atmosphere.

7. The combination of claim 6 wherein said highway brake system includes similar spring operated parking brakes, said rail and highway parking brakes being released when said supply pipe remains operatively connected to said source of compressed air.

8. The combination of claim 2 wherein said first control valve means includes means to limit maximum rail brake cylinder pressure in response to pressure in said rail air spring means due to vehicle weight.

9. The combination of claim 2 and additional valve means, said additional valve means including a control port, and said additional valve means being connected to said brake pipe, and controlled by pressure resulting from a difference between the rate at which air is supplied at said control port and the rate at which it is being consumed, so that when consumption is excessive said brake pipe is vented to atmosphere through said additional valve means causing emergency brake application.

* * * * *